US009342565B1

(12) United States Patent  (10) Patent No.: US 9,342,565 B1
Morton  (45) Date of Patent: *May 17, 2016

(54) VARIABLE QUERY GENERATION

(71) Applicant: Google Inc., Mountain View, CA (US)

(72) Inventor: Michael Salomon Morton, Lyme, NH (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,955

(22) Filed: May 15, 2015

Related U.S. Application Data

(63) Continuation of application No. 13/750,791, filed on Jan. 25, 2013, now Pat. No. 9,037,598.

(51) Int. Cl.
G06F 17/30 (2006.01)

(52) U.S. Cl.
CPC .... G06F 17/30551 (2013.01); G06F 17/30117 (2013.01); G06F 17/30864 (2013.01)

(58) Field of Classification Search
CPC .......... G06F 17/3064; G06F 17/30864; G06F 17/30867; G06F 17/276; G06F 17/30696; G06F 17/3097; G06F 3/0237; G06F 9/444
USPC ............. 707/999.003, 706, 731, 767; 710/18; 715/257
See application file for complete search history.

(56) References Cited

U.S. PATENT DOCUMENTS

| | | | | |
|---|---|---|---|---|
| 6,646,572 B1* | 11/2003 | Brand | ................... | G06F 3/0219 341/22 |
| 8,645,825 B1* | 2/2014 | Cornea | ............... | G06F 17/3064 715/257 |
| 8,706,750 B2* | 4/2014 | Hansson | ............. | G06F 17/3064 707/731 |
| 2006/0088356 A1* | 4/2006 | Jawerth | ................... | G06F 1/162 400/472 |
| 2006/0159507 A1* | 7/2006 | Jawerth | ................... | G06F 1/162 400/472 |
| 2006/0206454 A1* | 9/2006 | Forstall | ............. | G06F 17/30864 |
| 2008/0133505 A1* | 6/2008 | Bayley | .............. | G06F 17/30864 |
| 2008/0177994 A1* | 7/2008 | Mayer | ................... | G06F 9/4418 713/2 |
| 2008/0209229 A1* | 8/2008 | Ramakrishnan | .. | G06F 17/30032 713/186 |
| 2008/0313359 A1* | 12/2008 | Chi | ........................ | G06F 9/4446 710/18 |
| 2009/0019002 A1* | 1/2009 | Boulis | ................. | G06F 17/3064 |
| 2010/0010989 A1* | 1/2010 | Li | ..................... | G06F 17/30675 707/E17.017 |
| 2012/0167009 A1* | 6/2012 | Davidson | .............. | G06F 17/276 715/816 |
| 2012/0235921 A1* | 9/2012 | Laubach | ............... | G06F 3/0238 345/172 |
| 2012/0317097 A1* | 12/2012 | Tseng | ............... | G06F 17/30864 707/722 |
| 2013/0046544 A1* | 2/2013 | Kay | .................... | G06F 3/04883 704/275 |

* cited by examiner

*Primary Examiner* — Dennis Truong
(74) *Attorney, Agent, or Firm* — Middleton Reutlinger

(57) ABSTRACT

An example device includes a memory and one or more processors configured to receive an indication of a first set of characters, responsive to determining that a predetermined amount of time has elapsed since the indication of the first set of characters was received, execute a query generated based on the first set of characters, to determine a typing speed associated with the first set of characters, and to generate, based on the predetermined amount of time and the typing speed, an adjusted amount of time, the adjusted amount of time being different from the predetermined amount of time. The processor(s) are further configured to receive an indication of a second set of characters, and responsive to determining that the adjusted amount of time has elapsed since the indication of the second set of characters was received, execute a second query generated based on the second set of characters.

19 Claims, 4 Drawing Sheets

VARIABLE QUERY GENERATION

BACKGROUND

Computing devices, such as a desktop, laptop, or tablet computers, may enable a user to search for specific data that is accessible via the computing device. For example, the computing device may provide a web browser, through which the user may access or otherwise interface with a search engine system. In turn, the user may provide textual input via the search engine interface. The computing device may submit the textual input, or "search string," to the search engine as a query. By submitting the textual input to the search engine, the computing device may solicit, from the search engine, search results that are based on the search string.

SUMMARY

In one example, a method includes receiving, by a computing device, an indication of a set of characters, and responsive to determining that a predetermined amount of time has elapsed since the indication of the first set of characters was received, executing, by the computing device, a first query generated based on the first set of characters. The method further includes determining, by the computing device, a typing speed associated with the first set of characters, and generating, by the computing device and based on the predetermined amount of time and the typing speed, an adjusted amount of time, the adjusted amount of time being different from the predetermined amount of time. The method further includes receiving, by the computing device, an indication of a second set of characters, and responsive to determining that the adjusted amount of time has elapsed since the indication of the second set of characters was received, executing, by the computing device, a second query generated based on the second set of characters.

In another example, a computer-readable storage device is encoded with instructions that, when executed, cause one or more programmable processors of a computing device to receive an indication of a first set of characters, and responsive to determining that a predetermined amount of time has elapsed since the indication of the first set of characters was received, execute a first query generated based on the first set of characters. The instructions further cause the programmable processor(s) of the computing device to determine a typing speed associated with the first set of characters, and generate, based on the predetermined amount of time and the typing speed, an adjusted amount of time, the adjusted amount of time being different from the predetermined amount of time. The instructions further cause the programmable processor(s) of the computing device to receive an indication of a second set of characters, and responsive to determining that the adjusted amount of time has elapsed since the indication of the second set of characters was received, execute a second query generated based on the second set of characters.

In another example, a device includes a memory and one or more programmable processors. The programmable processor(s) are configured to receive an indication of a first set of characters, and responsive to determining that a predetermined amount of time has elapsed since the indication of the first set of characters was received, execute a first query generated based on the first set of characters. The programmable processor(s) are further configured to determine a typing speed associated with the first set of characters, and to generate, based on the predetermined amount of time and the typing speed, an adjusted amount of time, the adjusted amount of time being different from the predetermined amount of time. The programmable processor(s) are further configured to receive an indication of a second set of characters, and responsive to determining that the adjusted amount of time has elapsed since the indication of the second set of characters was received, execute a second query generated based on the second set of characters.

The details of one or more examples of the disclosure are set forth in the accompanying drawings and the description below. Other features, objects, and advantages of the disclosure will be apparent from the description and drawings, and from the claims.

DETAILED DESCRIPTION

A computing device, or programs executing at the computing device, may receive textual input and generate a query based on the textual input. For instance, a web browser executing on a computing device may receive, at a search bar or at a combined search/address bar of the web browser's interface, textual input corresponding to a search string. The search string may represent a set of characters, such as one or more words, that the user wishes to submit as a search query, e.g., to a search engine executing on a remote computing system with which the computing device communicates. In turn, the computing device may generate a query based on the received search string, and submit the query by communicating the query to the remote system that executes the search engine.

In some examples, the computing device may generate and submit the query in response to a user input, such as a press of an "enter" key on a traditional keyboard, or a tap of an "enter" key of a graphical keyboard displayed at a presence-sensitive device (e.g. using a finger, stylus, or other input object). In these and other examples, the computing device may generate and submit the query in response to a click event, such as a click performed using a traditional mouse, or through a tap of a finger or stylus on a presence-sensitive device. For instance, the user may place a cursor at a "submit" element of the web browser's interface, and provide a click or tap as described above.

In other implementations, the computing device may generate and submit the query based on a time calculation associated with receiving the textual input. In some such examples, if the computing device detects a typing pause that exceeds a predetermined threshold time period (e.g., 600 milliseconds), the computing device may generate and submit a query based on already-received text. However, the use of a standard threshold period may not serve equally well in all scenarios, as different users may have different typing speeds and/or different levels of typing accuracy. Additionally, a single user may have different typing speeds and/or levels of accuracy when using different types of computing devices or input devices.

In general, techniques of this disclosure are directed to dynamically setting different typing pause thresholds in different use cases. A computing device implementing the techniques may vary the pause threshold based on various criteria, such as heuristic data associated with typing activity on the device, a user's identity, a device type or device identity, current settings of an executing program, and others. By varying the pause threshold under different circumstances, the computing device may provide one or more potential advantages. In various scenarios, the computing device may more efficiently and accurately generate and submit a query based on received textual input. As one example, the computing device may avoid prematurely submitting a query due to a typing pause by a novice typist.

Figure 1:
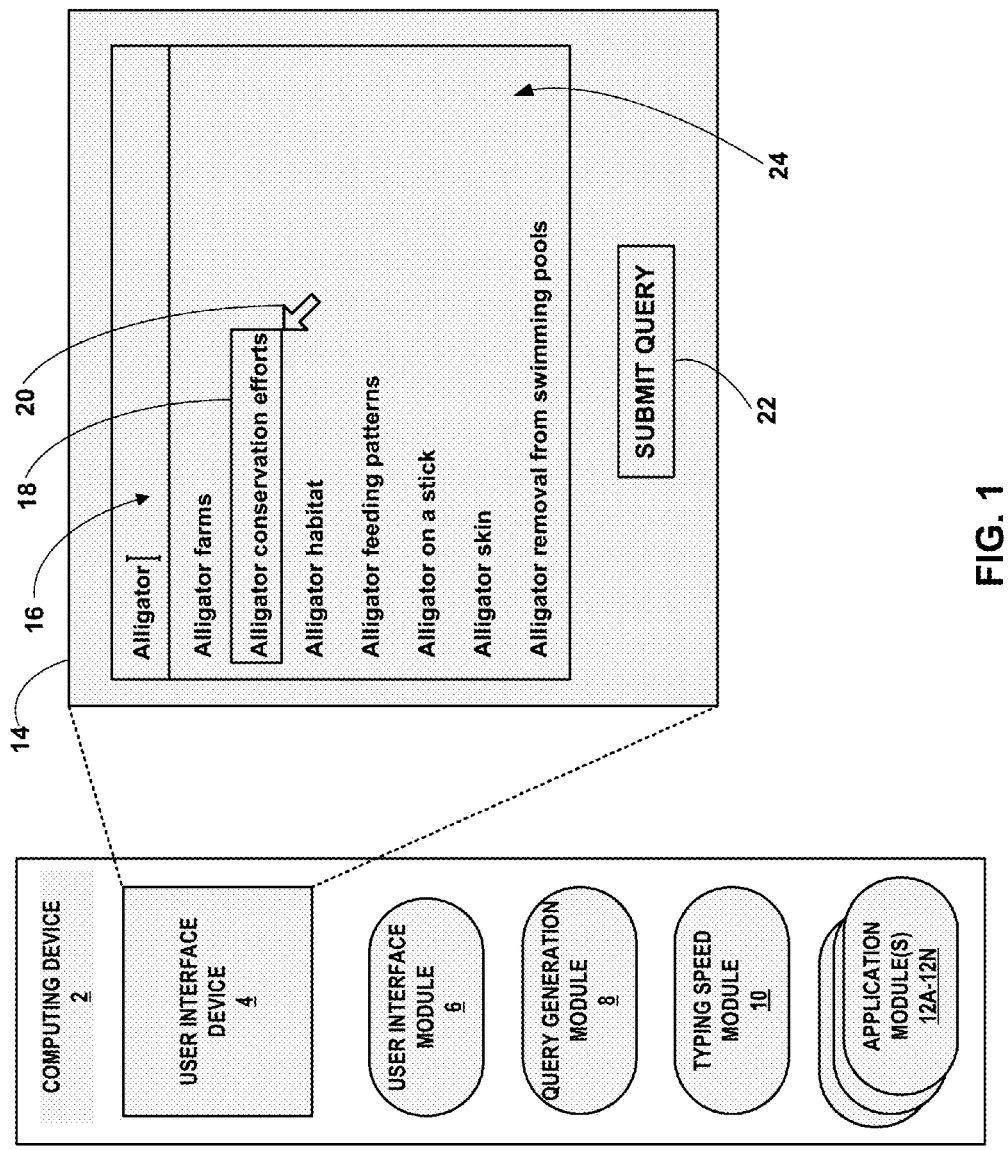
FIG. 1 is a conceptual diagram illustrating details of a computing device and a user interface (UI) for query generation, in accordance with one or more aspects of this disclosure.

FIG. 1 is a conceptual diagram illustrating details of computing device 2 and user interface (UI) 14 for query generation, in accordance with one or more aspects of this disclosure. Computing device 2 may include, be, or be part of one or more of a variety of types of devices including desktop computers, laptop computers (including so-called "netbooks" and "ultrabooks"), mobile phones (such as "smartphones"), personal digital assistants (PDAs), tablet computers, convertible laptop/tablet computers, watches, and various others. As shown in the example of FIG. 1, various elements are shown as being included, stored, or otherwise implemented in computing device 2. In some examples, however, one or more of these elements may be included, stored, or otherwise implemented in one or more devices that are separate and distinct from computing device 2. In such examples, the one or more devices that are separate and distinct from computing device 2 are coupled (physically, communicatively, and/or operatively) to computing device 2. Computing device 2 may access functionalities of remotely-implemented modules in implementing the variable query generation techniques of this disclosure.

As shown, computing device 2 may include user interface (UI) device 4. UI device 4 may represent any device or combination of devices that may provide or output UI 14 for display. Examples of UI device 4 may include a liquid crystal display (LCD) monitor, a light emitting diode (LED) monitor, a cathode ray tube (CRT) monitor, and a presence-sensitive display device, such as a touchscreen. In examples where UI device 4 includes a presence-sensitive display device, UI device 4 may also be configured or otherwise operable to receive user input through detection of proximity of or contact with an input object, such as a stylus or a user's finger.

In the example of FIG. 1, computing device 2 may also include application modules 12A-12N. Application modules 12 may be configured or otherwise operable to perform operations based on various stimuli, such as user input. As one example, one or more of application modules 12 may utilize UI device 4 to output UI 14 in various instances. Additionally, the relevant application module(s) 12 may receive user input, and generate output based on user input received by computing device 2. Application modules 12 may also communicate the output to a user through various facilities provided by mobile computing device 2, such as by displaying the output in a readable format via UI device 4 (e.g., within UI 14). Application module(s) 12 may, in various instances, implement functionalities provided by a manufacturer of computing device 2 and/or functionalities provided by another party (often referred to as "third party applications").

Computing device 2 may also include user interface (UI) module 6. UI module 6 may generate UI 14, and cause UI device 4 to display UI 14. UI module 6 may generate and/or modify UI 14 based on data received from other modules or components of computing device 2. In the example of FIG. 1, UI module 6 may generate UI 14 to include several elements, such as search bar 16, suggested query dropdown list 24, and query submission button 22. Additionally, UI module 6 may provide cursor 20, which may move within UI 14 responsive to user input received using an input device such as a mouse, touchpad, or stylus. In turn, the user may select or activate various elements of UI 14 by placing cursor 20 over the element, and providing a selection input, such as a click or a tap gesture. In the example of FIG. 1, a user has placed cursor 20 over query suggestion 18 (e.g., by "mousing over" query suggestion 18), causing UI module 6 to visually differentiate query suggestion 18 (e.g., by highlighting query suggestion 18).

UI module 6 may receive textual input (e.g., an indication of one or more characters) from a user when the user enters text into search bar 16. More specifically, UI module 6 may provide search bar 16 as an element through which a user may enter search strings, such as one or more words, that the user wishes to submit as a query to a search engine executing on a remote device with which computing device 2 communicates. In some examples, search bar 16 may be part of a combined search/address bar, at which a user may enter a uniform resource locator (URL) of a website to directly access the website without using the search engine, or may enter a search string to submit as a query to a search engine. Upon entering a search string, the user may activate query submission button 22 (e.g., via placement of cursor 20 and providing the selection input), to cause computing device 2 to generate a query based on the search string, and submit the generated query to the search engine.

In some examples, query generation module 8 may generate suggested queries and/or alternate queries based on text already entered at search bar 16. In the example of FIG. 1, a user has entered the word "Alligator" at search bar 16. Based on various factors, such as heuristic data collected from past searches, query generation module 8 may generate one or more suggested queries, and cause UI module 6 to display the suggested queries at UI device 4. In turn, UI module 6 may receive a user selection of one of the suggested queries, and submit the selected query to the search engine.

In the example of FIG. 1, query generation module 8 may append characters to the search string to generate the suggested queries. This technique of generating suggested queries by appending characters may be referred to herein as "autocompletion" or "autocomplete." FIG. 1 is illustrated with respect to autocomplete suggestions in which additional words are appended to the search string (e.g., the additional words demarcated from the search string by one or more space characters). However, query generation module 8 may also generate autocomplete suggestions by extending an existing string. As one example, query generation module 8 may extend the word "present" to generate suggestions such as "presents," "presenting," and "presentation." In another example, query generation module 8 may identify an incomplete word, such as "alligat" and autocomplete the incomplete word to read "alligator." In this manner, query generation module 8 may implement autocomplete in a number of ways to generate query suggestions.

Query generation module 8 may cause UI module 6 to display the suggested queries in a dedicated UI element or sub-element, such as suggested query dropdown list 24. In some instances, UI module 6 may begin displaying suggested query dropdown list 24 responsive to receiving an indication of one or more query suggestions from query generation module 8. Additionally, query generation module 8 may cause UI module 6 to dynamically update suggested query dropdown list 24 as a user modifies the search string entered at search bar 16. For instance, in the example illustrated in FIG. 1, query generation module 8 may detect entry of the letter "f" after the word "Alligator" at search bar 16. In response, query generation module 8 may modify suggested query dropdown list 24 to remove all suggested queries except for "Alligator farms" and "Alligator feeding patterns." In some examples, query generation module 8 may add query suggestions based on the updated search string, such as "Alligator fossils."

In various implementations, query generation module 8 may set a maximum number of query suggestions for suggested query dropdown list 24, such as seven query suggestions, as illustrated in FIG. 1. Query generation module 8 may use one or more criteria to select the query suggestions to display in suggested query dropdown list 24. As one example, query generation module 8 may select queries that are most commonly searched, based on past search statistics provided by one or more search engines to which computing device 2 may submit the query. As another example, query generation module 8 may select "popular" queries, such as queries that have been submitted with greater frequency during a recent time frame. As yet another example, query generation module 8 may include locally-cached queries, such as queries that computing device 2 has submitted in the past, and has stored at one or more storage devices that are local to computing device 2. In some implementations, query generation module 8 may rank the selected query suggestions (e.g., based on one or more of the criteria described above). Additionally, query generation module 8 may arrange the selected query suggestions based on the rankings, such as in descending order of rank. In this manner, query generation module 8 may select and arrange query suggestions for inclusion in suggested query dropdown list 24.

Query generation module 8 may, in some implementations, execute a query based on a search string if query generation module 8 does not receive additional textual input for a predetermined period of time. More specifically, query generation module 8 may detect a pause or stoppage in typing that is at least as long as the predetermined amount of time. In response to the predetermined amount of time elapsing since receiving the search string, query generation module 8 may be configured to automatically generate a query based on the unmodified search string and submit the query to the search engine. In various implementations, the predetermined amount of time (e.g., a threshold time period) may be a static value. In other words, in such implementations, query generation module 8 may not dynamically adjust the value of the threshold time period.

As described, the use of a static threshold time period may present certain potential issues, such as inflexibility with respect to varying typing speeds. To prevent, mitigate, or remedy such issues, query generation module 8 may implement one or more techniques of this disclosure to dynamically adjust the threshold time period, thereby providing intuitive or dynamically variable query generation under different circumstances. In one example, typing speed module 10 may detect a typing speed associated with a search string entered at search bar 16. Typing speed module 10 may use various techniques known in the art to discern typing speeds, and may express the typing speeds in various measures, such as words-per-minute (WPM), characters-per-minute, and characters-per-second.

Based on the discerned typing speed, typing speed module 10 may adjust the threshold time period for generation of future queries by query generation module 8. For instance, if typing speed module 10 determines that the typing speed is relatively slow (e.g., less than a threshold WPM rate), typing speed module 10 may increase the threshold time period. More specifically, typing speed module 10 may, based on the slow typing speed, cause query generation module 8 to increase the threshold time period for query generation. By increasing the threshold time period for query generation, typing speed module 10 and query generation module 8 may reduce the occurrences of premature query execution (e.g., submission of a query before a user is finished typing a search string). For instance, in the example illustrated in FIG. 1, query generation module 8 may wait for a greater amount of time before generating a query with the word "Alligator" if typing speed module 10 detects a slow typing speed. By waiting for the additional amount of time, query generation module 8 may permit a relatively slow typist or less accurate/proficient typist to enter additional characters search bar 16 or to select one a suggested query from suggested query dropdown list 24 prior to automatically generating a query.

Conversely, if typing speed module 10 detects that the typing speed associated with the received search string is relatively fast (e.g., greater than the threshold WPM rate), typing speed module 10 may cause query generation module 8 to reduce the threshold time period for query generation. By reducing the threshold time period, typing speed module 10 may assist faster typists to avail of the automatic query generation functionalities provided by query generation module 8. As one example, a faster typist may not, in the course of entering a search string at search bar 16, pause for the threshold time period. As a result, such a typist may actively select query submission button 22 in a high proportion of instances, instead of waiting for query generation module 8 to generate a query. In turn, such faster typists may rarely, if ever, avail of automatic query generation functionalities provided by computing device 2. However, by reducing the threshold time period, typing speed module 10 and query generation module 8 may reduce the length of the pause required for query generation, thereby enabling faster typists to avail of automatic query generation. In this manner, typing speed module 10 and query generation module 8 may adjust the threshold time period for typing pauses, thereby providing variable query generation capabilities for typists of varying speeds.

In some implementations, query generation module 8 may adjust the threshold time period for typing pauses based on the typing speeds of particular users. As one example, typing speed module 10 may identify typing speeds associated with particular user accounts of computing device 2. In turn, query generation module 8 may adjust the threshold time period differently for the different user accounts. For instance, query generation module 8 may increase the threshold time period for a user account associated with a slower typing speed, and reduce the threshold time period for a user account associated with a faster typing speed. Alternatively, query generation module 8 may increase the threshold time period by different factors for two different user accounts. In turn, typing speed module 10 may continually monitor the typing speed associated with each user account, and query generation module 8 may continue to adjust the corresponding pause threshold based on improvement and/or deterioration in a user's typing speed. In this manner, typing speed module 10 and query generation module 8 may customize the query generation techniques of this disclosure for particular users based on each user's typing speed. Additionally, typing speed module 10 and query generation module 8 may update or fine-tune the query generation settings based on changes in a particular user's typing speed.

Typing speed module 10 may also evaluate various factors that contribute to a user's typing speed, and use these factors in causing query generation module 8 to adjust the pause threshold. As one example, typing speed module 10 may detect a frequency with which a user corrects his/her own typing, such as by deleting an entered character and replacing the deleted character. For instance, typing speed module 10 may log a user's presses of a delete key and/or a backspace key provided at a traditional or virtual keyboard. The logged data may provide a number and/or a frequency of character deletion commands submitted by the user while providing textual input. Based on the data logged by typing speed module 10, query generation module 8 may determine to what extent a user's typing is prone to error. Query generation module 8 may increase the pause threshold for a more error-prone typist, and conversely, may reduce the pause threshold for a less error-prone (or more accurate) typist.

Additionally, typing speed module 10 may disregard, or otherwise minimize, adjustments to typing speed caused by a user's selection of query suggestions from suggested query dropdown list 24. For instance, typing speed module 10 may calculate a user's typing speed based on the characters entered at search bar 16, and may not adjust the typing speed calculation caused by a user's addition of characters (or entire words) via selection of a query suggestion. However, typing speed module 10 may continue to log error-correction statistics based on a user's deletion and replacement of incorrectly selected query suggestions. In some specific examples, typing speed module 10 may assign a lower weight to (or disregard) pauses between typing and selecting a query suggestion, or pauses between the press of a delete/backspace key and entering a corrected character. In this manner, typing speed module 10 may mitigate inaccuracies caused by text input that is not indicated by a user's typing, while still accounting for errors in the user's entry of textual data.

In some implementations, query generation module 8 may cause UI module 6 to display suggested query dropdown list 24 only after the threshold pause (adjusted or otherwise) has elapsed. In the specific example of FIG. 1, query generation module 8 may cause UI module 6 to display suggested query dropdown list 24 after the adjusted time period for a current user account has elapsed since entry of the word "Alligator" at search bar 16. By displaying suggested query dropdown list 24 after the pause threshold has elapsed, query generation module 8 may enable a user to evaluate the presented query suggestions when user is ready, rather than distracting the user while the user is still entering a search string.

Additionally, query generation module 8 may adjust the pause threshold differently based on different device types. As one example, query generation module 8 may identify a computing device type (e.g., a smartphone, or a particular model thereof) associated with computing device 2. In turn, query generation module 8 may adjust the pause threshold (either generically, or for a particular user) based on user typing histories associated with the device type. For instance, query generation module 8 may use typing statistics associated with a particular user account on a particular smartphone model number, and adjust the pause threshold for the user account, if computing device 2 matches the smartphone model number.

In these and other examples, query generation module 8 may detect a device type associated with an input device through which a user enters the search string. For example, in a scenario where computing device 2 is a tablet computer, a user may input text through one or both of a virtual keyboard displayed at UI device 4, or through a traditional keyboard that is coupled to computing device 2 (e.g., via universal serial bus, or "USB"). In turn, query generation module 8 may adjust the pause threshold differently for each type of input device (e.g., based on past typing statistics associated with the user's typing on each type of input device).

Figure 2:
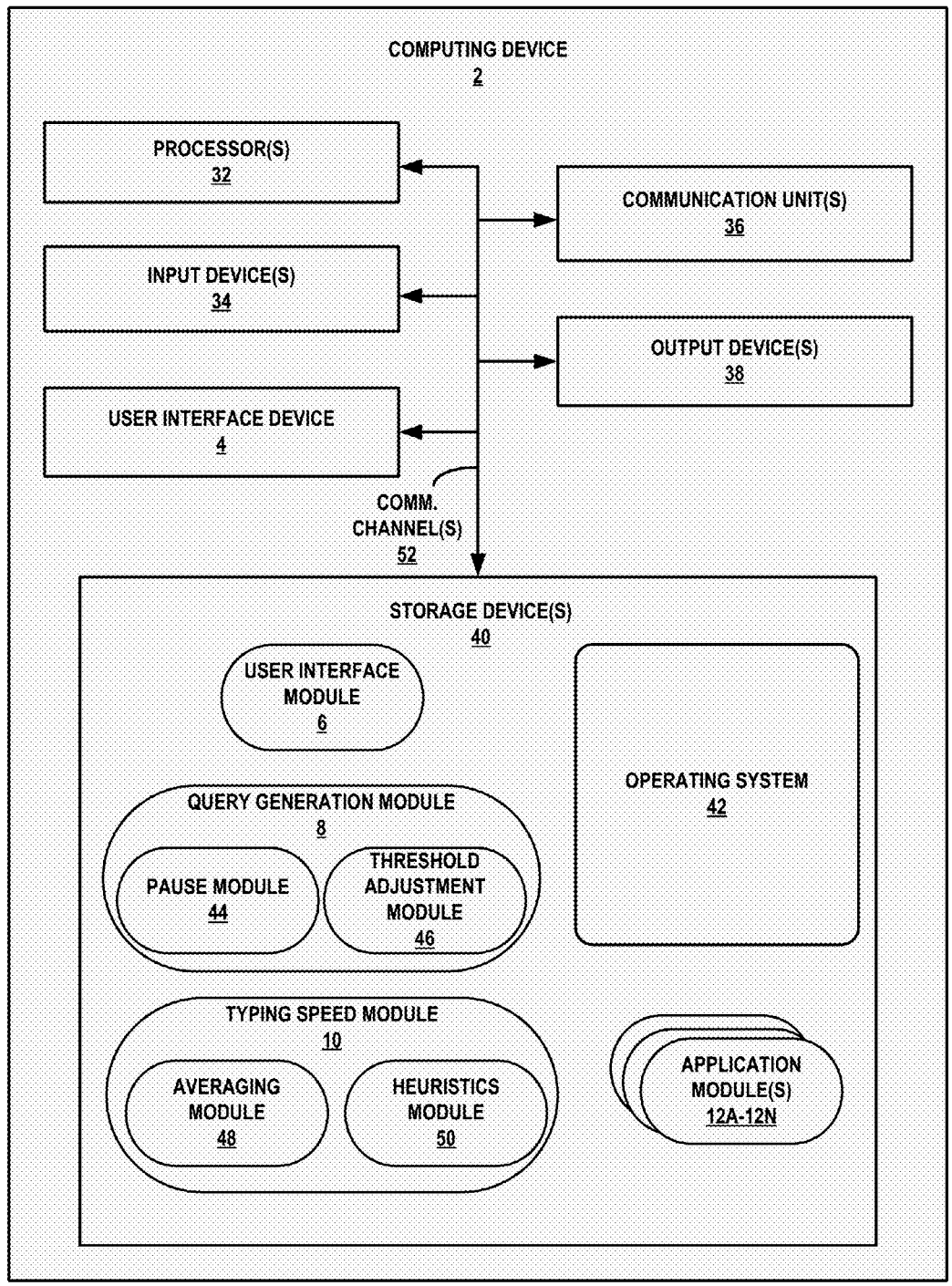
FIG. 2 is a block diagram illustrating further details of one example implementation of a computing device for query generation, in accordance with one or more aspects of this disclosure.

FIG. 2 is a block diagram illustrating further details of one example implementation of computing device 2 for query generation, in accordance with one or more aspects of this disclosure. Commonly numbered elements of FIGS. 1 and 2 may operate similarly. For ease of discussion, only those elements with different element numbers from FIG. 1 are described with respect to FIG. 2. It will be appreciated that other implementations of computing device 2 shown in FIG. 1 may perform one or more techniques of this disclosure, and that different implementations may be used in various instances. Although shown in FIGS. 1 and 2 as a stand-alone computing device 2 for purposes of example, computing device 2 may be any component or system that includes a processor (e.g., processor(s) 32) or other suitable computing environment for executing software instructions and, for example, need not include one or more of the elements shown in FIG. 2 (e.g., input devices 34, UI device 4, output devices 38).

As shown in the example of FIG. 2, computing device 2 may include one or more processors 32, one or more input devices 34, one or more communication units 36, one or more output devices 38, one or more storage devices 40, and user interface (UI) device 4. Computing device 2, in one implementation, further includes application modules 12A-12N and operating system 42, that are executable by computing device 2. Each of components 4, 32, 34, 36, 38, and 40 may be interconnected (physically, communicatively, and/or operatively) for inter-component communications. In some examples, communication channel(s) 52 may include a system bus, network connection, inter-process communication data structure, or any other channel for communicating data. As one example in FIG. 2, components 4, 32, 34, 36, 38, and 40 may be coupled by one or more communication channel(s) 52. Application modules 12 and operating system 42 may also communicate information with one another as well as with other components in computing device 2.

Processor(s) 32, in one example, are configured to implement functionality and/or process instructions for execution within computing device 2. For example, processor(s) 32 may be capable of processing instructions stored in storage device(s) 40. Examples of processor(s) 32 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 40 may be configured to store information within computing device 2 during operation. Storage device(s) 40, in some examples, are described as a computer-readable storage medium and/or as one or more computer-readable storage devices. In some examples, storage devices 40 comprise temporary memory, meaning that a primary purpose of storage device(s) 40 is not long-term storage. Storage device(s) 40, in some examples, are described as a volatile memory, meaning that storage device(s) 40 do not maintain stored contents when the computer is turned off. Examples of volatile memories include random access memories (RAM), dynamic random access memories (DRAM), static random access memories (SRAM), and other forms of volatile memories known in the art. In some examples, storage device(s) 40 are used to store program instructions for execution by processor(s) 32. Storage device(s) 40, in one example, are used by software or applications running on computing device 2 (e.g., application modules 12) to temporarily store information during program execution.

Storage device(s) 40, in some examples, also include one or more computer-readable storage media. Examples of such computer-readable storage media may include a non-transitory computer-readable storage medium, and various computer-readable storage devices. Storage device(s) 40 may be configured to store larger amounts of information than volatile memory. Storage device(s) 40 may further be configured for long-term storage of information. In some examples, storage device(s) 40 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 36. Computing device 2, in one example, utilizes communication unit 36 to communicate with external devices via one or more networks, such as one or more wireless networks. Communication unit 36 may be a network interface card, such as an Ethernet card, an optical transceiver, a radio frequency transceiver, or any other type of device that can send and receive information. Other examples of such network interfaces may include Bluetooth®, 3G, 4G, and WiFi® radios computing devices as well as Universal Serial Bus (USB). In some examples, computing device 2 utilizes communication unit 36 to wirelessly communicate with an external device.

Computing device 2, in one example, also includes one or more input devices 34. Input device(s) 34, in various examples, are configured to receive input from a user through tactile, audio, or video feedback. Examples of input device(s) 34 include a presence-sensitive display (such as a touchscreen), a mouse, a keyboard, a voice responsive system, video camera, microphone or any other type of device for detecting a command from a user. In some examples, a presence-sensitive display includes a touch-sensitive screen.

One or more output devices 38 may also be included in computing device 2. Output device(s) 38, in some examples, are configured to provide output to a user using tactile, audio, or video stimuli. Output device(s) 38, in various examples, include a presence-sensitive display (e.g., a touchscreen), a sound card, a video graphics adapter card, or any other type of device for converting a signal into an appropriate form understandable to humans or machines. Additional examples of output device(s) 38 include a speaker, a cathode ray tube (CRT) monitor, a liquid crystal display (LCD), or any other type of device that can generate output that is intelligible to a user.

In some examples, UI device 4 may include functionality of input device(s) 34 and/or output device(s) 38. In the example of FIG. 2, UI device 4 may include, be, or be part of a presence-sensitive screen, such as a touch-sensitive screen, a touchscreen, or the like. In some examples, a presence-sensitive display may detect an object at and/or near the screen of the presence-sensitive display. As one non-limiting example range, a presence-sensitive display may detect an object, such as a finger or stylus, which is within two inches or less of the physical screen of the presence-sensitive display. The presence-sensitive display may determine a location (e.g., an (x,y) coordinate) of the presence-sensitive display at or near which the object was detected. In another non-limiting example range, a presence-sensitive display may detect an object 6 inches or less from the physical screen of the presence-sensitive display, and other exemplary ranges are also possible. The presence-sensitive display may determine the location selected by the object (e.g., user's finger) using capacitive, inductive, and/or optical recognition techniques. In some examples, the presence-sensitive display provides output using tactile, audio, or video stimuli as described with respect to output device 38.

Computing device 2 may include operating system 42. Operating system 42, in some examples, controls the operation of components of computing device 2. For example, operating system 42, in one example, facilitates the communication of application module(s) 12 with processor(s) 32, communication unit(s) 36, storage device(s) 40, input device(s) 34, and output device(s) 38. As shown in FIG. 2, storage device(s) 40 may include UI module 6, keyboard module 8, gesture module 10, and text selection module 12, as described in FIG. 1. In turn, in the example implementation of computing device 2 illustrated in FIG. 2, text selection module 12 includes sub-modules, namely, selection-level module 58 and selection adjustment module 60. Various modules illustrated in FIG. 2 may each include program instructions and/or data that are executable by computing device 2. As one example, UI module 6 may include instructions that cause computing device 2 to perform one or more of the operations and actions described in the present disclosure.

As shown in FIG. 2, computing device 2 may include query generation module 8, which, in turn, may include pause module 44 and threshold adjustment module 46. Additionally, typing speed module 10 may include averaging module 48 and heuristics module 50. The components of query generation module 8 and typing speed module 10 may, either singly or in various combinations, implement the variable query generation techniques described herein.

Pause module 44 of query generation module 8 may be configured or otherwise operable to detect typing pauses when receiving textual input via one or more input devices 34. Additionally, pause module 44 may measure the time associated with each detected typing pause. In various implementations, pause module 44 may share counts, times, and other pause-related data with threshold adjustment module 46 and/or typing speed module 10 (or one or more components thereof). In various implementations, threshold adjustment module 46 may be configured to modify the pause threshold used by query generation module 8 in executing a query based on received textual input. Threshold adjustment module 46 may adjust the pause threshold based on data generated by typing speed module 10 and one or more components thereof.

Averaging module 48 of typing speed module 10 may be configured or otherwise operable to compute average typing speeds and average pause times, and provide the average values to threshold adjustment module 46. Averaging module 48 may compute various types of average values, such as mean, median, or mode values. While averaging module 48 may compute various types of average values, for purposes of clarity, the functionalities of averaging module 48 are described herein with respect to mean values. Additionally, averaging module 48 may calculate other average-based values, such as standard deviations, and provide such values to other components of computing device 2, as well.

Additionally, averaging module 48 may calculate the mean pause times for a particular variable, or for a particular set of variables. Examples of such variables may include a user's identity, a device type of computing device 2, and a device type of a particular one of input devices 34 through which computing device 2 receives the textual input. For instance, averaging module 48 may calculate a mean pause time for user profile A, while using a 104-key keyboard of input devices 34, and supply the calculated mean to threshold adjustment module 46. Based on the mean pause time, threshold adjustment module 46 may set a pause threshold for user profile A while using the 104-key keyboard. However, threshold adjustment module 46 may not adjust the pause threshold for other combinations of factors, such as user profile A while using an 88-key keyboard, or for a different user profile while using the 104-key keyboard. In this manner, averaging module 48 and threshold adjustment module 46 may customize pause thresholds for various use cases, such as use cases involving different keyboard layouts.

To adjust the pause threshold based on a mean typing speed calculated by averaging module 48, threshold adjustment module 46 may perform various calculations on the mean pause time. In various implementations, threshold adjustment module 46 may base the adjusted threshold on the following formula: $[(100+X)\%*T]$, where T is the mean pause time, and X is a predetermined "tuning number." Threshold adjustment module 46 may set the value of X based on various criteria. For instance, threshold adjustment module 46 may set the value of X higher for a use case that exhibits greater standard deviation in pause times. By setting X to a higher value for use cases exhibiting greater standard deviation, threshold adjustment module 46 may cause query generation module 8 to allow for greater pause time fluctuation before executing a query based on previously received textual input. In other examples, threshold adjustment module 46 may use X in combination with a predetermined pause time, such as by setting the adjusted threshold to $[200+X]$ milliseconds.

Additionally, the greater standard deviation may indicate a low proficiency use case (e.g., a novice typist, or a typist who is unfamiliar with a particular keyboard configuration). In a low proficiency use case, a greater threshold pause time may allow a user ample opportunity to correct any errors in the entered text. Conversely, threshold adjustment module 46 may set X to a lower value under certain circumstances, such as a higher proficiency use case (e.g., one that exhibits low standard deviation). In some higher proficiency use cases, threshold adjustment module 46 may set the value of X to zero, thereby setting the pause threshold to a value equal to the average pause time supplied by averaging module 48.

In some implementations, threshold adjustment module 46 may adjust the pause threshold using direct calculations based on the standard deviation supplied by averaging module 48. For example, threshold adjustment module 46 may adjust the pause threshold for a use case based on the following formula: $[T+(Y*S)]$, where T is the mean pause time, S is the standard deviation of the pause times for the use case, and Y is another predetermined tuning number. As described with respect to the previous example, in a low proficiency use case, threshold adjustment module 46 may set Y to a greater value, thereby generating a greater pause threshold and allowing a user more time to modify the entered text or to pause typing before query generation module 8 executes a query.

On the other hand, threshold adjustment module 46 may Y to a lower value in higher proficiency use cases (e.g., use cases exhibiting a mean pause time of 30 milliseconds). For example, in one particular higher proficiency use case, threshold adjustment module 46 may set the value of Y to one. In this example, threshold adjustment module 46 may set the pause threshold to a time corresponding to the mean pause time plus the standard deviation calculated by averaging module 48. In other higher proficiency use cases, threshold adjustment module 46 may set the value of Y to zero. In such examples, threshold adjustment module 46 may set the pause threshold to be equal to the mean pause time for the use case. In this manner, threshold adjustment module 46 may use the value of Y to weigh the standard deviation differently for different use cases, sometimes eliminating the standard deviation from the calculation entirely.

In some implementations, threshold adjustment module 46 may dynamically update the values of tuning numbers X and Y as a user continues to enter textual input. More specifically, typing-based statistics calculated by typing speed module 10, such as the mean pause time, standard deviation of the pause times, and typing error rate may fluctuate at the beginning of the text entry (e.g., due to a user getting oriented to the keyboard or collecting his/her thoughts on the text to enter). As the amount of entered text increases, the typing-based statistics may stabilize, causing threshold adjustment module 46 to vary the values of X and Y within smaller ranges, or not vary the values at all. In some such implementations, threshold adjustment module 46 may trigger adjustment of the pause threshold (e.g., through initiating values of X and Y) after a threshold number of characters have been input. In this manner, threshold adjustment module 46 may begin any threshold-adjustment determinations (i.e., activate variable query generation) only after typing speed module 10 has gathered and analyzed a sufficient sample size of data.

Additionally, in some examples, threshold adjustment module 46 may explicitly vary the values of tuning numbers X and Y based on a number of characters already entered. For instance, threshold adjustment module 46 may decrement the values of one or both of X and Y with each additional character (or group of characters) entered. By decrementing the values of X and Y based on the number of characters entered, threshold adjustment module 46 may utilize tuning numbers X and Y as "confidence scores." More specifically, with the receipt of additional characters, threshold adjustment module 46 may move the adjusted pause threshold closer to a user's mean typing pause, or to the mean typing pause added to the corresponding standard deviation, depending on which formula/tuning number threshold adjustment module 46 utilizes.

Threshold adjustment module 46 may also use distances between consecutively pressed keys on a keyboard in assigning weights to particular pauses. Additionally, threshold adjustment module 46 may determine the distance between keys based on the nature of a particular keyboard of input devices 34. For instance, in the context of a traditional keyboard, threshold adjustment module 46 may recognize a relatively long logical distance between the keys representing the letters 'r' and 'b.' More specifically, threshold adjustment module 46 may recognize the distance based on the common typing practice of pressing the 'r' and 'b' keys with the index finger of the left hand. Among the keys commonly pressed with the left index finger, transitioning between the 'r' and 'b' keys may elicit the greatest effort on the part of a user. In comparison, threshold adjustment module 46 may recognize a relatively short logical distance between the 'f' and 'g' keys, which are also commonly pressed using the left index finger.

As another example, in the context of a virtual keyboard displayed at UI device 4, threshold adjustment module 46 may recognize a relatively short logical distance between the 'a' and '1' virtual keys. More specifically, threshold adjustment module 46 may recognize the short logical distance based on the common practice of typing with two thumbs when entering text using a virtual keyboard. In this context, although the 'a' and '1' keys are physically positioned at opposite ends of the virtual keyboard, the common two-thumb typing approach may enable a user to press the 'a' and '1' keys in quick succession, using one thumb for each key. In some implementations, UI module 6 may detect that a user is entering text using a gesture keyboard, in which case threshold adjustment module 46 may recognize a long distance between the 'a' and '1' keys, but a short distance between the 'a' and 's' keys. In this manner, threshold adjustment module 46 may determine inter-key distances based on specific use case contexts.

Similarly, in the context of a virtual keyboard, threshold adjustment module 46 may recognize a longer logical distance between characters that are presented on alternate keyboards. For instance, threshold adjustment module 46 may recognize a longer distance between letter characters and numerical characters. More specifically, in the context of many virtual keyboards, letters and numbers may be presented on alternate keyboards. In other words, a user may need to switch between the alternate keyboards, such as by pressing a switch key. Similarly, threshold adjustment module 46 may recognize a longer logical distance between many punctuation marks (which are often presented via a dedicated alternate keyboard) and one or both of letters and numbers.

In turn, threshold adjustment module 46 may cause averaging module 48 to assign a greater weight to pauses between presses of logically close keys, and assign a lesser weight to pauses between presses of logically distant keys. More specifically, averaging module 48 may be more sensitive to typing difficulty indicated by longer pauses between presses of logically close keys. Conversely, averaging module 48 may minimize the effect of typing pauses between logically distant keys in calculating average pause times and/or standard deviations. In this manner, averaging module 48 may generate pause time-based statistics that take into account logical distances between character keys, and the effort that the logical distances may require of a user in entering text.

In some implementations, threshold adjustment module 46 may trigger adjustment of the pause threshold based on detecting one or more particular types of communicative connections enabled by communication unit(s) 36. As one example, threshold adjustment module 46 may refrain from adjusting the pause threshold if threshold adjustment module 46 detects that computing device 2 is coupled via only a second generation (2G) cellular connection. In this example, threshold adjustment module 46 may trigger pause threshold adjustment upon detecting that computing device is communicatively coupled via a third generation (3G) or fourth generation (4G) cellular connection, or via a wireless Internet connection (such as WiFi). In this manner, threshold adjustment module 46 may implement the pause threshold adjustment techniques based on active connections, thereby implementing the techniques in situations of greater data bandwidth availability, while refraining from implementing the techniques in situations of lesser bandwidth availability.

As shown in FIG. 2, typing speed module 10 may also include heuristics module 50. Heuristics module 50 may be configured or otherwise operable to log typing-based statistics detected by typing speed module 10, and other related data. Additionally, heuristics module 50 may sort the logged data according to use case, such as by one or more of a user profile, a device type of computing device 2, and a device type of a particular one of input devices 34 through which textual input is received. In various implementations, heuristics module 50 may store the logged data locally at computing device 2 (e.g., at storage device(s) 40), remotely at one or more external devices (e.g., by communicating the data using communication unit(s) 36), or a combination of local and remote storage. In some examples, heuristics module 50 may delete or attach lesser weights to older data, or supply only recent data to other components of computing device 2, thereby assisting the other components to base determinations on more recent data. In this manner, heuristics module 50 may enable computing device 2 to store the logged information in a variety of ways, thereby providing backup and sharing capabilities.

In various examples, heuristics module 50 may log information pertaining to the accuracy of functionalities implemented by query generation module 8. As one example, heuristics module 50 may log statistics to user selections of suggested queries. For instance, heuristics module 50 may log a number of times and/or a frequency with which a user selects a suggested query for execution. A user selection of a suggested query may indicate greater accuracy of prediction algorithms implemented by query generation module 8.

Conversely, heuristics module 50 may log statistics that indicate potential inaccuracies of the prediction algorithms implemented by query generation module 8. More specifically, heuristics module 50 may log a number of times and/or a frequency with which a user continues to enter text in spite of query generation module 8 causing UI module 6 to output suggested queries for display. In several instances, a user may, by continuing to enter text after being presented with suggested queries, decline to select any of the suggested queries. In turn, a user's disinclination to select any of the suggested queries may be associated with inaccuracy of the predictive output of query generation module 8. Based on the comparative data logged by heuristics module 50, query generation module 8 and components thereof may determine an accuracy rate of past query suggestions, and may adjust future query suggestions and/or pause thresholds accordingly.

By logging data associated with both accurate query predictions as well as inaccurate predictions, heuristics module 50 may provide computing device 2 (and/or external devices coupled to computing device 2) with comparative data pertaining to the accuracy of the predictive data provided by query generation module 8. In examples, the comparative data logged by heuristics module 50 may enable threshold adjustment module 46 to fine-tune the values assigned to tuning numbers X and Y described above. Additionally, query generation module 8 may utilize the comparative data logged by heuristics module 50 to choose between prediction algorithms to implement, or to fine-tune prediction algorithms that are currently implemented. In this manner, heuristics module 50 may enable other components of computing device 2 (and optionally, components of external devices) to improve their performance based on logged data.

Heuristics module 50 may also provide various devices, including computing device 2, with use case information, thereby saving time and resources that may otherwise be expended in identifying a use case. As one example, heuristics module 50 may log typing speeds and pause time information for a particular user profile while using computing device 2. In this example, heuristics module 50 may store the logged data remotely. If, at a later time, the same user profile is active on a second device that shares the particular device type of computing device 2, the second device may download or otherwise import the logged data, and set the threshold pause time and/or values of X and Y. More specifically, the second device need not regenerate typing-related data already generated by typing speed module 10. In this manner, heuristics module 50 may mitigate time and resource consumption by enabling reuse of previously logged use case data.

Figure 3:
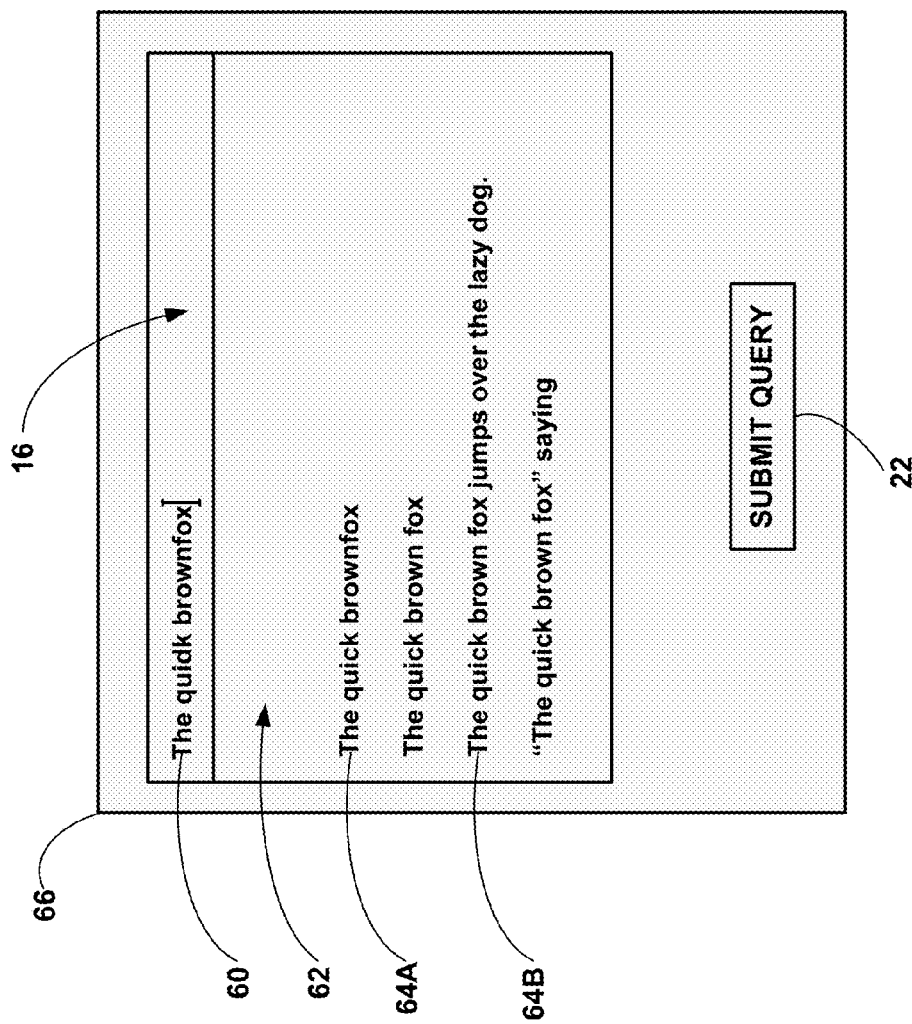
FIG. 3 is a conceptual diagram illustrating a user interface (UI) that a computing device may output for query generation using spelling correction, in accordance with one or more aspects of this disclosure.

FIG. 3 is a conceptual diagram illustrating user interface (UI) 66 that a computing device may output for query generation using spelling correction, in accordance with one or more aspects of this disclosure. Commonly numbered elements of FIGS. 1 and 3 may operate similarly. For ease of discussion, only those elements with different element numbers from FIG. 1 are described separately with respect to FIG. 3. Additionally, for purposes of clarity, aspects of FIG. 3 may be described with respect to components and modules of computing device 2 illustrated in FIGS. 1-2.

In the example of FIG. 3, search string 60 entered in search bar 16 may include one or more spelling and/or grammatical errors. More specifically, portions of search string 60 may not match lexicon entries accessible to computing device 2, such as an English language dictionary. Examples of spelling errors may include typographical errors resulting from erroneous, superfluous, or missing key presses. Examples of grammatical errors may result from typographical errors such as missing or superfluous spaces between words or strings, incorrect usage of plural words, and others. Query generation module 8 may be configured or otherwise operable to detect spelling and grammatical errors, and correct the detected errors in one or more suggested queries displayed in suggested query dropdown list 62.

Query suggestion 64A is an example of a spell-corrected query suggestion. More specifically, query suggestion module 8 may generate query suggestion 64A by detecting a spelling error in one or more words of search string 60, and correcting the spelling error. For example, query suggestion module 8 may determine that a character string of search string 60 does not match any lexicon entries, and modify the character string to match a lexicon entry that is similar to the misspelled string. In the specific example of query suggestion 64A, query suggestion module may correct the string "quidk" to the word "quick" by detecting and correcting an erroneous key press. As shown, query suggestion module 8 may generate query suggestion 64A without performing the autocomplete techniques described with respect to FIG. 1.

Query suggestion 64B is an example of query suggestion that is corrected for both spelling and grammatical errors, and is augmented by the autocomplete functionalities of query suggestion module 8. As shown, query suggestion 64B includes the spelling correction of "quidk" to "quick" described above. Additionally, query suggestion 64B includes a grammatical correction of the string "brownfox" to the word sequence "brown fox." In this example, query suggestion module 8 may detect a grammatical error based on a missing space, and add a space to correct the error. Query suggestion 64B also includes autocomplete text, as shown by the word sequence "jumps over the lazy dog" appended to search string 60.

FIG. 3 illustrates query generation techniques of this disclosure that may incorporate spelling and/or grammatical correction along with autocomplete functionalities. Other examples of spelling and/or grammatical correction methods that query generation module 8 may implement include transpositions (e.g., correcting "istihs" to "is this" by swapping adjacent characters) and correcting superfluous/extraneous characters (e.g., correcting "isthiis" to "is this" by deleting a superfluous letter).

Figure 4:
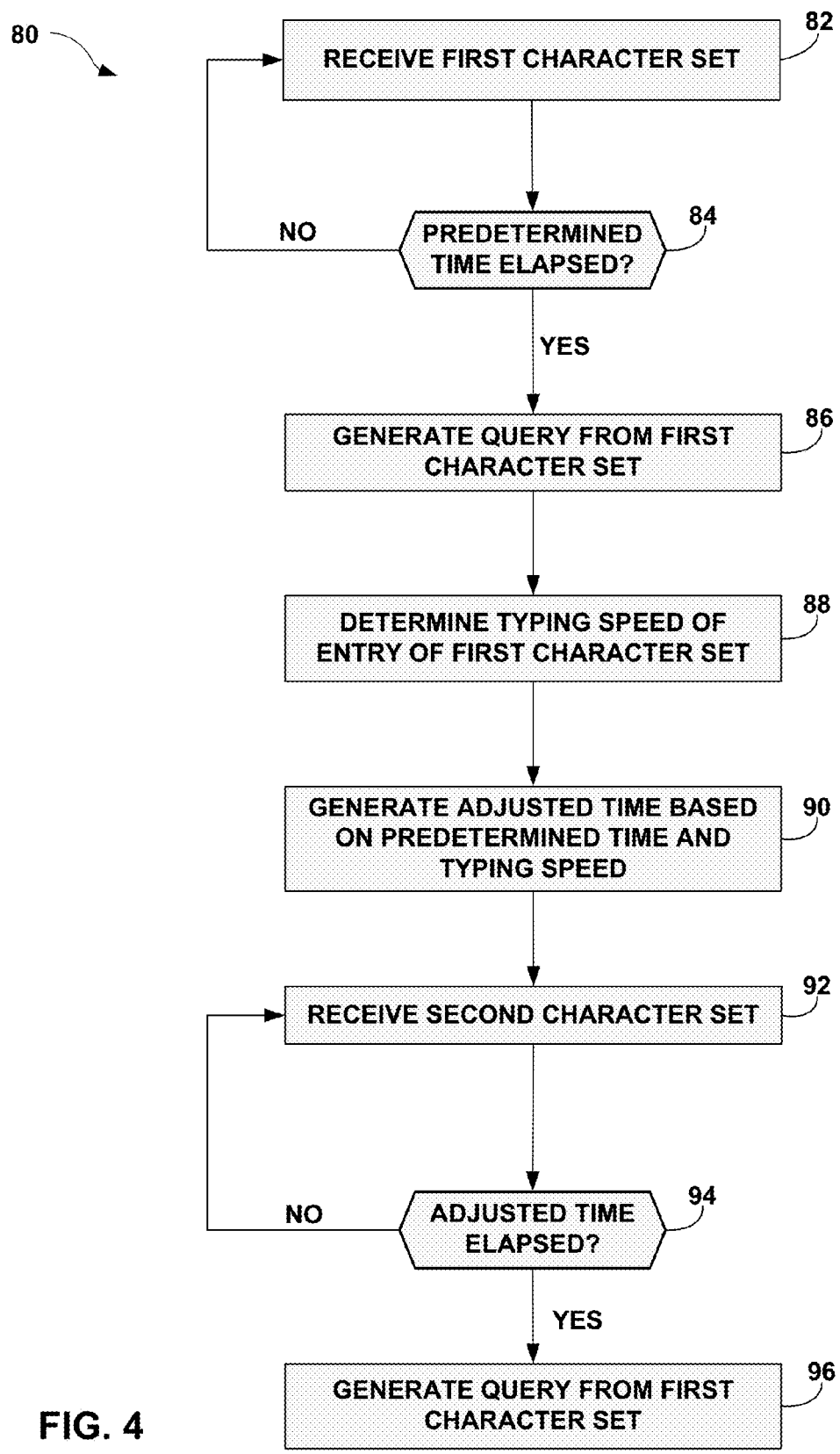
FIG. 4 is a flowchart illustrating an example process that may be performed by a computing device for query generation, in accordance with one or more aspects of this disclosure.

FIG. 4 is a flowchart illustrating an example process 80 that may be performed by a computing device for query generation, in accordance with one or more aspects of this disclosure. Although process 80 may be performed by a variety of devices to implement one or more techniques of this disclosure, for purposes of clarity, process 80 is described herein with respect to computing device 2 illustrated in FIGS. 1-2, and various components thereof. UI module 6 of computing device 2 may receive an indication of a first set of characters (82). Additionally, pause module 44 may determine whether a predetermined amount of time has elapsed since UI module 6 received the indication of the first set of characters (84).

Responsive to pause module 44 determining that the predetermined amount of time has elapsed since the indication of the first set of characters was received by UI module 6 ("YES" branch of 84), query generation module 8 may execute a query based on the first set of characters (86). Conversely, if pause module 44 determines that the predetermined time period has not elapsed ("NO" branch of 84), UI module 6 may continue to receive the indication of the first character set or wait for indications of additional characters of the first character set (i.e., thereby returning to 82).

Typing speed module 10 may determine a typing speed associated with the first set of characters (88). Additionally, threshold adjustment module 46 may generate, based on the predetermined amount of time and the typing speed, an adjusted amount of time that is different from the predetermined amount of time (90).

UI module 6 may receive an indication of a second set of characters (92). Additionally, pause module 44 may determine whether the adjusted amount of time has elapsed since UI module 6 received the indication of the second character set (94). Responsive to pause module 44 determining that the adjusted amount of time has elapsed since the indication of the second set of characters was received ("YES" branch of 94), query generation module 8 may execute a second query based on the second set of characters (96). On the other hand, if pause module 44 determines that the adjusted amount of time has not elapsed ("NO" branch of 94), UI module 6 may continue to receive the indication of the second character set or wait for indications of additional characters of the second character set (i.e., thereby returning to 92).

In some instances, one or both of query generation module 8 and typing speed module 10 may identify one or more user accounts associated with the computing device, identify an active user account of the one or more user accounts, such that the indication of the first set of characters is received while the computing device operates under the active user account, and assign, to the active user account, the adjusted amount of time. In some examples, threshold adjustment module 46 may generate the adjusted amount of time responsive to determining that the first set of characters includes at least a threshold number of characters.

In some examples, threshold adjustment module 46 may generate the adjusted amount of time based at least in part on a device type associated with computing device 2. In one such example, query generation module 8 and/or typing speed module 10 may identify a device type associated with one or more of input device(s) 34, where the indication of the first set of characters is received via user input entered at the input device of input device(s) 34, and where threshold adjustment module 46 generates the adjusted amount of time based at least in part on the identified device type associated with the input device of input device(s) 34.

In some implementations, UI module 6 may receive the first set of characters at least in part by receiving one or more character deletion commands, where typing speed module 10 determines the typing speed at least in part by determining at least one of a number of character deletion commands and a frequency associated with receiving the one or more character deletion commands, and where threshold adjustment module 46 generates the adjusted amount of time based at least in part on determining at least one of the number of character deletion commands and the frequency associated with receiving the one or more character deletion commands. In some such implementations, threshold adjustment module 46 may generate the adjusted amount of time at least in part by determining, based on one or more recovery times associated with UI module 6 receiving the indication of the first set of characters, one or more weighted recovery times, where each respective recovery time of the one or more recovery times indicates a time measured from receiving a respective deletion command of the one or more deletion commands to receiving a respective character of the first set of characters. In one such implementation, threshold adjustment module 46 may determine that the value of at least one weighted recovery time is zero.

As one example, threshold adjustment module 46 may generate the adjusted amount of time at least in part by generating, based on an accuracy rate associated with a plurality of past queries, the adjusted amount of time. As another example, threshold adjustment module 46 may generate the adjusted amount of time at least in part by determining a plurality of pause times, each respective pause time from the plurality of pause times being associated with a respective pair of characters of the first set of characters, determining, based on the plurality of pause times, an average pause time, determining, based on the average pause time and the plurality of pause times, a standard deviation from the average pause time, and generating, based at least in part on the average pause time and the standard deviation from the average pause time, the adjusted amount of time. In one implementation of this example, threshold adjustment module 46 may generate the adjusted amount of time based at least in part on the formula [T+(Y*S)], where T represents the average pause time, Y represents a predetermined tuning number, and S represents the standard deviation.

In some examples, threshold adjustment module 46 may generate the adjusted amount of time at least in part by determining a plurality of pause times, each respective pause time of the plurality of pause times being associated with a respective pair of characters of the first set of characters, determining, based on the plurality of pause times, an average pause time, and generating, based at least in part on the average pause time and the predetermined amount of time, the adjusted amount of time. In some such examples, threshold adjustment module 46 may generate the adjusted amount of time is based at least in part on the formula [(100+X)%*T], where X represents a predetermined tuning number and T represents the average pause time. In one such example, threshold adjustment module 46 may decrement a value of X based on a number of characters included in the first set of characters.

As another example, threshold adjustment module 46 may generate the adjusted amount of time responsive to determining a connection type associated with a network connection provided by communication unit(s) 36 of computing device 2. As yet another example, threshold adjustment module 46 may determine a plurality of logical distances associated with the first set of characters, each respective logical distance from the plurality of logical distance being associated with a respective pair of characters of the first set of characters, where threshold adjustment module 46 may generate the adjusted amount of time based at least in part on the determined plurality of logical distances.

In one implementation of this example, plurality of logical distances is determined based on a keyboard layout associated with input device(s) 34 of computing device 2. In another implementation of this example, threshold adjustment module 46 may generate the adjusted amount of time at least in part by determining, based on the typing speed determined by typing speed module 10 and the plurality of logical distances associated with the first set of characters, one or more weighted pause times associated with UI module 6 receiving the indication of the first set of characters.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium or computer-readable storage device encoded with instructions. Instructions embedded or encoded in an article of manufacture including an encoded computer-readable storage medium or computer-readable storage device, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise a tangible or non-transitory media, such as one or more computer-readable storage devices. The term "non-transitory" may indicate that the storage medium is not embodied in a carrier wave or a propagated signal. In certain examples, a non-transitory storage medium or non-transitory computer-readable storage device may store data that can, over time, change (for example, in RAM or cache).

While described generally herein with respect to entering input via typing, it will be appreciated that techniques of this disclosure may apply to other modes of input entry, as well. Examples of such modes may include detecting movement of an input object (e.g., finger or stylus), detecting movement or clicks (including double- or other multiple clicks) of a mouse, detecting device rotation through use of a gyroscope, and detecting device movement through use of an accelerometer.

In situations in which the systems discussed herein may collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Various aspects of the disclosure have been described. Aspects or features of examples described herein may be combined with any other aspect or feature described in another example. These and other examples are within the scope of the following claims.

What is claimed is:

1. A method comprising:
    receiving, by a computing device, an indication of a first set of characters, wherein receiving the indication of the first set of characters comprises receiving, by the computing device, one or more character deletion commands;
    determining that a predetermined amount of time has elapsed since the indication of the first set of characters was received;
    responsive to determining that the predetermined amount of time has elapsed, submitting a first query generated based on the first set of characters, the submitting of the first query being to a search engine to solicit search results based on the first query;
    determining, by the computing device, a typing speed associated with the first set of characters, wherein determining the typing speed comprises determining, by the computing device, at least one of a number of the one or more character deletion commands and a frequency associated with receiving the one or more character deletion commands;
    generating, by the computing device and based on the predetermined amount of time and the typing speed, an adjusted amount of time, the adjusted amount of time being different from the predetermined amount of time, and wherein generating the adjusted amount of time is based at least in part on the at least one of the number of character deletion commands and the frequency associated with receiving the one or more character deletion commands;
    receiving, by the computing device, an indication of a second set of characters;
    determining that the adjusted amount of time has elapsed since the indication of the second set of characters was received; and
    responsive to determining that the adjusted amount of time has elapsed, submitting a second query generated based on the second set of characters, the submitting of the second query being to the search engine to solicit search results based on the second query.

2. The method of claim 1, further comprising:
    identifying, by the computing device, one or more user accounts associated with the computing device;
    identifying, by the computing device, an active user account of the one or more user accounts, such that the indication of the first set of characters is received while the computing device operates under the active user account; and
    assigning, to the active user account, the adjusted amount of time.

3. The method of claim 1, further comprising:
    wherein generating the adjusted amount of time is responsive to determining that the first set of characters includes at least a threshold number of characters.

4. The method of claim 1, wherein generating the adjusted amount of time is based at least in part on a device type associated with the computing device.

5. The method of claim 1, further comprising:
    identifying a device type associated with an input device coupled to the computing device,
    wherein the indication of the first set of characters is received via user input entered at the input device, and
    wherein generating the adjusted amount of time is based at least in part on the identified device type associated with the input device.

6. The method of claim 1, wherein generating the adjusted amount of time further comprises:
    determining, by the computing device and based on one or more recovery times associated with receiving the indication of the first set of characters, one or more weighted recovery times,
    wherein each respective recovery time of the one or more weighted recovery times indicates a time measured from receiving a respective deletion command of the one or more deletion commands to receiving a respective character of the first set of characters.

7. The method of claim 6, wherein a value of at least one of the one or more weighted recovery times is zero.

8. The method of claim 1, wherein generating the adjusted amount of time further comprises:
    generating, by the computing device and based on an accuracy rate associated with a plurality of past queries, the adjusted amount of time.

9. The method of claim 1, wherein generating the adjusted amount of time further comprises:
    determining, by the computing device, a plurality of pause times, each respective pause time from the plurality of pause times being associated with a respective pair of characters of the first set of characters;
    determining, by the computing device and based on the plurality of pause times, an average pause time;
    determining, by the computing device and based on the average pause time and the plurality of pause times, a standard deviation from the average pause time; and
    generating, by the computing device and based at least in part on the average pause time and the standard deviation from the average pause time, the adjusted amount of time.

10. The method of claim 9, wherein generating the adjusted amount of time is based at least in part on the formula $[T+(Y*S)]$, wherein T represents the average pause time, Y represents a predetermined tuning number, and S represents the standard deviation.

11. The method of claim 1, wherein generating the adjusted amount of time further comprises:
    determining, by the computing device, a plurality of pause times, each respective pause time of the plurality of pause times being associated with a respective pair of characters of the first set of characters;

determining, by the computing device and based on the plurality of pause times and by the computing device, an average pause time; and generating, by the computing device and based at least in part on the average pause time and the predetermined amount of time, the adjusted amount of time.

12. The method of claim 11, wherein generating the adjusted amount of time is based at least in part on a tuning number and the average pause time.

13. The method of claim 12, further comprising:
determining a value of the tuning number based on a number of characters included in the first set of characters.

14. The method of claim 1, wherein generating the adjusted amount of time is responsive to determining a connection type associated with a network connection of the computing device.

15. The method of claim 1, further comprising:
determining, by the computing device, a plurality of logical distances associated with the first set of characters, each respective logical distance from the plurality of logical distance being associated with a respective pair of characters of the first set of characters,
wherein generating the adjusted amount of time is based at least in part on the determined plurality of logical distances.

16. The method of claim 15, wherein the plurality of logical distances is determined based on a keyboard layout associated with the computing device.

17. The method of claim 15, wherein generating the adjusted amount of time further comprises:
determining, by the computing device and based on the determined typing speed and the plurality of logical distances associated with the first set of characters, one or more weighted pause times associated with receiving the indication of the first set of characters.

18. A device comprising:
a memory; and
one or more programmable processors configured to:
receive an indication of a first set of characters, wherein the first set of characters comprises one or more character deletion commands;
determine that a predetermined amount of time has elapsed since the indication of the first set of characters was received;
responsive to determining that the predetermined amount of time has elapsed, submit a first query generated based on the first set of characters to a search engine to solicit search results based on the first query;
determine a typing speed associated with the first set of characters based at least in part on at least one of a number of the one or more character deletion commands and a frequency associated with receiving the one or more character deletion commands;
generate, based on the predetermined amount of time and the typing speed, an adjusted amount of time, the adjusted amount of time being different from the predetermined amount of time, and wherein the adjusted amount of time is based at least in part on the at least one of the number of character deletion commands and the frequency associated with receiving the one or more character deletion commands;
receive an indication of a second set of characters;
determine that the adjusted amount of time has elapsed since the indication of the second set of characters was received; and
responsive to determining that the adjusted amount of time has elapsed, submitting a second query generated based on the second set of characters, the submitting of the second query being by the computing device to the search engine to solicit search results based on the second query.

19. A method comprising:
receiving, by a computing device, an indication of a first set of characters;
determining that a predetermined amount of time has elapsed since the indication of the first set of characters was received;
responsive to determining that the predetermined amount of time has elapsed, submitting a first query generated based on the first set of characters, the submitting of the first query being to a search engine to solicit search results based on the first query;
determining, by the computing device, a typing speed associated with the first set of characters;
determining, by the computing device, one or more weights associated with one or more travel distances associated with the first set of characters, each respective travel distance from the plurality of travel distances and each respective weight from the plurality of weights being associated with a respective pair of characters of the first set of characters;
generating, by the computing device and based on the predetermined amount of time and the typing speed, an adjusted amount of time, the adjusted amount of time being different from the predetermined amount of time, and wherein generating the adjusted amount of time is based at least in part on the one or more weights associated with the one or more travel distances;
receiving, by the computing device, an indication of a second set of characters;
determining that the adjusted amount of time has elapsed since the indication of the second set of characters was received; and
responsive to determining that the adjusted amount of time has elapsed, submitting a second query generated based on the second set of characters, the submitting of the second query being to the search engine to solicit search results based on the second query.

* * * * *